US012696905B2

(12) United States Patent
Goedeken et al.

(10) Patent No.: US 12,696,905 B2
(45) Date of Patent: Aug. 4, 2026

(54) HIGH-FAT FLOUR REPLACEMENT AND METHODS OF PREPARATION

(71) Applicant: General Mills, Inc., Minneapolis, MN (US)

(72) Inventors: Douglas L. Goedeken, Blaine, MN (US); Eric T. Gugger, Plymouth, MN (US); Jeffrey T. Huber, Robbinsdale, MN (US); Michelle Manderfeld, Plymouth, MN (US); Sara Rosene, New Hope, MN (US); Kenneth Eugene Smith, North Oaks, MN (US); Goeran Walther, Plymouth, MN (US); Scott K. Whitman, New Hope, MN (US)

(73) Assignee: General Mills, Inc., Minneapolis, MN (US)

( * ) Notice: Subject to any disclaimer, the term of this patent is extended or adjusted under 35 U.S.C. 154(b) by 532 days.

(21) Appl. No.: 18/122,834

(22) Filed: Mar. 17, 2023

(65) Prior Publication Data

US 2024/0306652 A1 Sep. 19, 2024

(51) Int. Cl.
| | |
|---|---|
| *A21D 10/00* | (2006.01) |
| *A21D 2/26* | (2006.01) |
| *A21D 2/36* | (2006.01) |
| *A21D 6/00* | (2025.01) |

(52) U.S. Cl.
CPC ........... *A21D 10/005* (2013.01); *A21D 2/263* (2013.01); *A21D 2/36* (2013.01); *A21D 6/003* (2013.01)

(58) Field of Classification Search
CPC ........ A21D 10/005; A21D 2/263; A21D 2/36; A21D 6/003
See application file for complete search history.

(56) References Cited

U.S. PATENT DOCUMENTS

| | | | |
|---|---|---|---|
| 5,567,465 | A | 10/1996 | Bauer et al. |
| 5,916,612 | A | 6/1999 | Bonnasse et al. |
| 6,210,722 | B1 * | 4/2001 | Wullschleger .......... A23L 7/115 |
| | | | 426/549 |
| 6,824,810 | B2 | 11/2004 | Sargent et al. |
| 7,141,265 | B2 | 11/2006 | Sakuma et al. |
| 7,807,207 | B2 | 10/2010 | Huang et al. |
| 9,210,940 | B2 | 12/2015 | Brandt et al. |
| 2004/0028789 | A1 | 2/2004 | Molle |
| 2004/0076731 | A1 | 4/2004 | Bourke et al. |
| 2005/0079247 | A1 | 4/2005 | Slilaty |
| 2013/0040034 | A1 * | 2/2013 | Matsubara ........... A21D 13/068 |
| | | | 426/549 |
| 2016/0262407 | A1 | 9/2016 | Kumar et al. |

FOREIGN PATENT DOCUMENTS

| | | |
|---|---|---|
| JP | 2002253156 | 3/2004 |
| WO | WO 2007/130070 | 11/2007 |
| WO | WO 2015/171906 | 11/2015 |
| WO | WO 2016/134858 | 9/2016 |

* cited by examiner

*Primary Examiner* — Katherine D Leblanc
(74) *Attorney, Agent, or Firm* — Jordan IP Law, LLC; Tina Yin Sowatzke, Esq.

(57) ABSTRACT

A high-fat flour replacement includes a fat, an emulsifier, a protein, a starch and a soluble fiber. In preferred embodiments, the high-fat flour replacement is a finely ground particulate "flour". The high-fat flour replacement can have a macronutrient profile analogous to that of almond flour. A process for producing a high-fat flour replacement includes a step of forming an emulsion including a fat, water and an emulsifier and a step of combining the emulsion with a blend of dry ingredients to form a composition (e.g., using an extruder). The blend of dry ingredients includes a protein, a starch and a soluble fiber. In preferred embodiments, the composition is processed in an extruder to form an extruded material (e.g., in the form of pellets). The fat in the emulsion becomes trapped in the composition during extrusion. In preferred embodiments, the extruded material is then dried and milled/ground to form flour-sized particulates.

13 Claims, No Drawings

HIGH-FAT FLOUR REPLACEMENT AND METHODS OF PREPARATION

FIELD OF THE INVENTION

The invention generally pertains to food products and methods of preparing food products. More particularly, the invention is related to a food product that is high in fat and can be used as a substitute for flour in making other food products, as well as technology for preparing the food product.

BACKGROUND OF THE INVENTION

Alternatives to wheat flour, such as almond flour, are being sought out by certain customers for various reasons. In some cases, customers seek flours having a lower carbohydrate content than wheat flour for dietary purposes. However, some alternative flours, including almond flour, can be expensive to produce, often have supply issues and/or raise environmental concerns.

SUMMARY OF THE INVENTION

A high-fat flour replacement that is lower in cost and more sustainable than almond flour has been developed. The high-fat flour replacement of the present invention is high in fat (e.g., between about 30% and about 60%) but remains dry in its ground form (i.e., particulate and preferably powder form). The high-fat flour replacement of the present invention includes a fat, an emulsifier, a protein, a starch and a soluble fiber. In preferred embodiments, the high-fat flour replacement is a finely ground particulate "flour". The high-fat flour replacement can have a granular nature and macronutrient profile analogous to that of almond flour. The high-fat flour replacement can include, e.g., from about 30 wt % to about 60 wt % fat, from about 2 wt % to about 10 wt % of an emulsifier, from about 15 wt % to about 30 wt % of protein, from about 8 wt % to about 20 wt % starch and from about 5 wt % to about 20 wt % of soluble fiber.

The fat includes one or more edible fats that are liquid at room temperature (e.g., canola oil, soybean oil), one or more edible fats that having a melting point from about 70° F. to about 180° F. (e.g., palm kernel), or a combination thereof. The emulsifier can include, e.g., one or more of sodium caseinate, phospholipids, sodium steroyl lactylate, sucrose ester of fatty acids, nonfat dry milk, soy protein (e.g., soy protein isolate), egg, and/or whey. In some embodiments, the emulsifier includes one or more emulsifiers of a lower HLB value that are fat soluble (e.g., mono-/or diglycerides, DATEM (diacetyl tartaric acid ester of mono-glycerides)). The protein component, which is distinct from the emulsifier component, is preferably a soy protein such as soy protein isolate. The starch can include rice starch, corn starch (e.g., common maize native starch), wheat starch and/or tapioca starch. In preferred embodiments, the soluble fiber includes soluble corn fiber. However, the soluble fiber could additionally or alternatively include inulin and/or polydextrose.

A process for producing a high-fat flour replacement of the present invention includes a step of forming an emulsion including a fat, water and an emulsifier. In some embodiments, the ratio of emulsifier to fat is from about 1:15 to about 1:5. The process further includes a step of combining the emulsion with a blend of dry ingredients to form a composition. In preferred embodiments, the emulsion and the blend of dry ingredients are combined in an extruder. The blend of dry ingredients includes a protein, a starch and a soluble fiber. In preferred embodiments, the ratio of starch to soluble fiber is from about 1:1 to about 1.5:1 (e.g., 1.2:1). The blend of dry ingredients can include from about 25% to about 35% of the starch, from about 20% to about 30% of the soluble fiber and from about 40% to about 50% of the protein.

In preferred embodiments, the composition is processed in an extruder to form an extruded material (e.g., in the form of pellets). The fat in the emulsion becomes trapped in the composition during extrusion. In preferred embodiments, the extruded material is then dried (e.g., to a moisture content below about 10%, or below about 5%, or to about 3.5%) to form a dried extruded material. Also in preferred embodiments, the process further includes a step of milling/grinding the extruded material or dried extruded material to form flour-sized particulates (e.g., about 425 microns) or powders.

DETAILED DESCRIPTION OF EMBODIMENTS

Initially, it should be noted that the embodiments of the present invention described below are not intended to be exhaustive or limit the invention to the precise forms disclosed in the following detailed description. Rather a purpose of the embodiments chosen and described is so that the appreciation and understanding by others skilled in the art of the principles and practices of the present invention can be facilitated.

Throughout the present description, unless otherwise specified, the concentrations expressed as percentages always refer to the weight/weight (w/w) percentage, i.e., grams of a given component per 100 g of composition, i.e., wt % or percent by weight. The term "about" refers to a deviation of up to plus/minus 10%, preferably plus/minus 5%.

A high-fat flour replacement that is lower in cost and more sustainable than almond flour has been developed. By "flour replacement" it is meant the resulting product is established for use as a substitute for flour in producing various food products. The high-fat flour replacement of the present invention is high in fat, preferably between about 30% and about 60% fat, but remains dry in its ground form (e.g., takes the form of a powder). The high-fat flour replacement can have a granular nature and macronutrient profile analogous to that of almond flour. Consumers seeking a low carbohydrate flour (e.g., keto diet-friendly) can employ the high-fat flour replacement of the present invention. Manufacturers or chefs looking to provide low carbohydrate food options can use the high-fat flour replacement to prepare fresh or shelf stable products such as brownies, cookies, muffins, pancakes or biscuits or dry mixes therefore, as well as refrigerated "place and bake" or frozen doughs.

Almond flour contains cellular structures that help retain its fat/oil content, which is important in preventing oiling out during milling/grinding of the almonds and delaying the formation of almond butter. Development of the present high-fat flour replacement involved retaining a high fat/oil content without increasing the carbohydrate content (keeping a low carbohydrate content). Retaining the fat/oil is important in preventing oiling out during manufacturing (e.g., during extrusion) and avoiding a sticky product. The present invention sets forth optimal formulas and techniques for replicating in the high-fat flour replacement the cellular structures of almond flour that help retain the fat/oil.

The high-fat flour replacement of the present invention includes a fat, an emulsifier, a protein, a starch and a soluble fiber. In preferred embodiments, the high-fat flour replacement is a finely ground particulate "flour". The high-fat flour replacement can include from about 30 wt % to about 60 wt % (e.g., from about 45 wt % to about 55 wt %) of the fat, from about 2 wt % to about 10 wt % (e.g., about 5 wt %) of the emulsifier, from about 15 wt % to about 30 wt % (e.g., about 20 wt %) of the protein, from about 8 wt % to about 20 wt % (e.g., from about 10 wt % to about 15 wt %) of the starch and from about 5 wt % to about 20 wt % (e.g., from about 8 wt % to about 13 wt %) of the soluble fiber. In some embodiments, the high-fat flour replacement includes from about 0% to about 10 wt % other carbohydrate (e.g., sugars, oligosaccharides). In some embodiments, the high-fat flour replacement has a moisture content below 10 wt % (e.g., 5% or less). The high-fat flour replacement can be gluten-free.

The fat includes one or more edible fats that are liquid at room temperature (e.g., canola oil, soybean oil), one or more edible fats that having a melting point from about 70° F. to about 180° F. (e.g., palm kernel), or a combination thereof. In preferred embodiments, the fat includes canola oil (e.g., high oleic canola oil). Preferably, the fat is present in an amount of at least 50 wt % of the high-fat flour replacement.

The emulsifier can include, e.g., one or more of sodium caseinate, phospholipids, sodium steroyl lactylate, sucrose ester of fatty acids, nonfat dry milk, soy protein (e.g., soy protein isolate), egg, and/or whey. In preferred embodiments, the emulsifier includes sodium caseinate. Sodium caseinate is water soluble, emulsifies well and maintains low viscosity. Sodium caseinate has an HLB (hydrophilic-lipophilic balance) value of about 14. In some embodiments, the emulsifier includes one or more emulsifiers of a lower HLB value that are fat soluble (e.g., mono-/or diglycerides, DATEM (diacetyl tartaric acid ester of mono-glycerides)).

The protein component, which is distinct from the emulsifier component, is preferably a soy protein such as soy protein isolate.

The starch can include rice starch, corn starch (e.g., common maize native starch), wheat starch and/or tapioca starch. Preferably, the starch is a suitable extrudable starch (e.g., gelatinizes in the heat of an extruder).

In preferred embodiments, the soluble fiber includes soluble corn fiber. However, the soluble fiber could additionally or alternatively include inulin and/or polydextrose.

A process for producing a high-fat flour replacement of the present invention includes a step of forming an emulsion including a fat, water and an emulsifier. In preferred embodiments, the step of forming the emulsion is performed at an elevated temperature (e.g., from about 70° F. to about 180° F.). In some embodiments, the emulsifier is blended with water until fully hydrated and then the fat is added and mixed while avoiding over foaming. Also in some embodiments, the resulting mixture is then run through a homogenizer (e.g., at 2500 psi) to form the emulsion. In some embodiments, the ratio of emulsifier to fat is from about 1:15 to about 1:5. The emulsion can include from about 30% to about 60% fat (e.g., from about 40% to about 55%) and from about 2% to about 10% emulsifier (e.g., about 5%). In some embodiments, the balance of the emulsion is water (i.e., the emulsion consists of a fat, an emulsifier and water). Examples and descriptions of the fat and emulsifier are described above with regards to the high-fat flour replacement product.

The process further includes a step of combining the emulsion with a blend of dry ingredients to form a composition. In preferred embodiments, the emulsion and the blend of dry ingredients are combined in an extruder. In some embodiments, the blend of dry ingredients is added (e.g., at 300 grams/minute) to the extruder before the emulsion is added (e.g., at 600 grams/minute). The blend of dry ingredients includes a protein, a starch and a soluble fiber. In preferred embodiments, the ratio of starch to soluble fiber is from about 1:1 to about 1.5:1 (e.g., 1.2:1). If the ratio of starch to soluble fiber is too high (e.g., above about 1.5:1) the emulsion can break, and the extruded product can be too firm. If the ratio of starch to soluble fiber is too low (e.g., below about 1:1), the extruded product can be too sticky. The blend of dry ingredients can include from about 25% to about 35% of the starch (e.g., about 30%), from about 20% to about 30% of the soluble fiber (e.g., about 25%) and from about 40% to about 50% of the protein (e.g., about 45%). In preferred embodiments, the amount of protein included in the dry blend of is such that the high-fat flour replacement has a protein content analogous to that of almond flour. In some embodiments, the blend of dry ingredients consists of a protein, a starch and a soluble fiber. Examples and descriptions of the protein, starch and soluble fiber are described above with regards to the high-fat flour replacement product.

In preferred embodiments, the composition is processed in an extruder to form an extruded material. The fat in the emulsion becomes trapped in the composition during extrusion. In some embodiments, the extruded material is in the form of pellets and the extruder die is sized 4 mm or less (e.g., about 1.9 mm). In preferred embodiments, the extruded material is then dried (e.g., to a moisture content below about 10%, or below about 5%, or to about 3.5%) to form a dried extruded material. In some embodiments, a tray drier, a belt drier or a fluidized bed drier is used. In preferred embodiments, the extruded material is dried at a temperature between about 150° F. and 250° F. (e.g., about 200° F.).

In preferred embodiments, the process further includes a step of milling/grinding the extruded material or dried extruded material to form flour-sized particulates (e.g., about 425 microns). Over-milling is avoided to prevent structural breakdown and release of fat/oil such that a paste is formed rather than a material in particulate or powder form.

In preferred embodiments, the high-fat flour replacement is used as a substitute for flour in forming doughs which can be used in making a wide variety of other food products.

EXAMPLES

Example 1-Preparation of exemplary high-fat flour replacement. A 50 pound batch of an emulsion was prepared using the ingredients detailed in Table 1 below. A 10 gallon Breddo Blender was preheated by spraying hot water. Water at 120° F. was added and then blended with the emulsifier (sodium caseinate) until the emulsifier was fully hydrated (about 15 minutes of blending, with both the agitator and scraper at 20 Hz). The fat (high oleic canola oil) was added and mixed for approximately 2 minutes to avoid over foaming (agitator at 40 Hz, scraper at 20 Hz). The resulting mixture was run through a homogenizer at 2500 psi to form the emulsion. A 25 pound batch of a blend of dry ingredients was prepared using the ingredients details in Table 2 below.

TABLE 1

| Emulsion Ingredient | Amount (lbs.) | Percentage of Emulsion |
|---|---|---|
| Water | 20 | 40% |
| High oleic canola oil | 27.5 | 55% |
| Sodium caseinate | 2.5 | 5% |

5

TABLE 2

| Dry Blend Ingredient | Amount (lbs.) | Percentage of Dry Blend |
|---|---|---|
| Starch | 7.5 | 30% |
| Soluble corn fiber (Promitor 85) | 6.25 | 25% |
| Isolated soy protein (Supro ST) | 11.25 | 45% |

The emulsion and blend of dry ingredients were added to an extruder, with emulsion being added at a rate of 600 grams/minute and the blend of dry ingredient being added at a rate of 300 grams/minute. The extruded material had no oiling out and had a stickiness score between 2 and 3 (on a scale of 1 to 5, with 1 indicating no stickiness and 5 indicating excessive stickiness). The extruded material was dried to a final moisture content of 3.5% using tray dryers at 200° F. for 60 minutes. Table 3 below indicates the final composition of the dried extruded material while Table 4 shows the nutritional composition of the dried extruded material.

TABLE 3

| Component of Dried Extruded Material | Percentage of Dried Extruded Material |
|---|---|
| High oleic canola oil | 50.00% |
| Sodium caseinate | 4.55% |
| Isolated soy protein | 20.45% |
| Starch | 13.64% |
| Soluble corn fiber | 11.36% |

TABLE 4

| Nutritional Component of Dried Extruded Material | Percentage of Dried Extruded Material |
|---|---|
| Fat | 50.00% |
| Protein | 22.95% |
| Starch | 13.64% |
| Fiber | 9.66% |
| Other carbohydrate | 3.75% |

6

The invention claimed is:

1. A method for producing a flour replacement, the method comprising
   forming an emulsion including water, a fat and an emulsifier,
   combining the emulsion with a dry blend including a protein, a starch and a soluble fiber to form a composition,
   extruding the composition to form an extruded material, and
   creating the flour replacement from the extruded material.

2. The method of claim 1, wherein forming the emulsion is performed at one or more temperatures from about 70° F. to about 180° F.

3. The method of claim 1, wherein the emulsion has a ratio of emulsifier to fat from about 1:15 to about 1:5.

4. The method of claim 1, wherein the emulsion includes from about 30% to about 60% fat and from about 2% to about 10% emulsifier.

5. The method of claim 1, wherein the ratio of ratio of starch to soluble fiber is from about 1:1 to about 1.5:1.

6. The method of claim 1, wherein the dry blend includes from about 25% to about 35% of the starch, from about 20% to about 30% of the soluble fiber and from about 40% to about 50% of the protein.

7. The method of claim 6, wherein the emulsifier includes sodium caseinate.

8. The method of claim 6, wherein the soluble fiber includes soluble corn fiber.

9. The method of claim 1, wherein the fat includes an edible fat, with the edible fat melting at between about 70° F. to about 180° F.

10. The method of claim 1, wherein creating the flour replacement includes drying the extruded material to form a dried extruded material having a moisture content below 10%.

11. The method of claim 10, further comprising milling or grinding the dried extruded material to a particulate form.

12. The method of claim 1, wherein the composition is extruded in the form of pellets.

13. The method of claim 1, further comprising making a dough using the flour replacement as a substitute for flour.

* * * * *